United States Patent [19]

Tajima et al.

[11] Patent Number: 4,756,875
[45] Date of Patent: Jul. 12, 1988

[54] APPARATUS FOR FILTERING WATER CONTAINING RADIOACTIVE SUBSTANCES IN NUCLEAR POWER PLANTS

[75] Inventors: Fumio Tajima; Tetsuo Yamamoto, both of Yokohama, Japan

[73] Assignee: Kabushiki Kaisha Toshiba, Kawasaki, Japan

[21] Appl. No.: 893,450

[22] Filed: Aug. 7, 1986

Related U.S. Application Data

[63] Continuation of Ser. No. 655,224, Sep. 27, 1984, abandoned.

[30] Foreign Application Priority Data

Sep. 29, 1983 [JP] Japan .................. 58-179175
Sep. 29, 1983 [JP] Japan .................. 58-179176

[51] Int. Cl.[4] .................. G21C 19/30; B01D 39/02
[52] U.S. Cl. .................. 376/313; 376/310; 210/500.23
[58] Field of Search .................. 376/313, 370, 310; 210/323.3, 500.23; 55/158

[56] References Cited

U.S. PATENT DOCUMENTS

| | | | |
|---|---|---|---|
| 3,660,281 | 5/1972 | Tober | 210/651 |
| 3,723,247 | 3/1973 | Leine et al. | 376/370 X |
| 4,096,032 | 6/1978 | Mayers et al. | 376/313 |
| 4,220,461 | 9/1980 | Samanta | 65/22 |
| 4,401,567 | 8/1983 | Shindo et al. | 210/500.2 |
| 4,414,113 | 11/1983 | Laterra | 210/636 |
| 4,537,740 | 8/1985 | Colburn | 376/313 X |
| 4,540,490 | 9/1985 | Shibata et al. | 210/412 X |

FOREIGN PATENT DOCUMENTS 55-73390 6/1980 Japan .

Primary Examiner—John F. Terapane
Assistant Examiner—John S. Maples
Attorney, Agent, or Firm—Foley & Lardner, Schwartz, Jeffery, Schwaab, Mack, Blumenthal & Evans

[57] ABSTRACT

An apparatus for filtering waste water containing radioactive solid particles or produced in a nuclear reactor power plant and wherein the water is filtered with a plurality of U-shaped hollow fibers each having a sponge like mesh structure containing numerous pores for trapping radioactive substances, the hollow fibers being made of flexible polyethylene and each pore having a diameter of about 0.1 micron. An air pipe is provided beneath the U-shaped hollow fibers for bubbling air into water to be filtered surrounding the fibers, thereby removing solid particles trapped in the pores.

8 Claims, 5 Drawing Sheets

APPARATUS FOR FILTERING WATER CONTAINING RADIOACTIVE SUBSTANCES IN NUCLEAR POWER PLANTS

This application is a continuation of application Ser. No. 655,224, filed Sept. 27, 1984, now abandoned.

BACKGROUND OF THE INVENTION

This invention relates to apparatus for filtering water containing radioactive substances, for example radioactive waste water produced in a nuclear electric power generating plant, or primary water of a boiling water type nuclear reactor.

As filtering apparatus of radioactive waste liquid produced in a nuclear electric power generating plant, it has been used a precise filtering device utilizing a filtering aid. But as ion exchange resin has been used as the filtering aid, a large quantity of used resin is produced thereby increasing the quantity of radioactive waste to be discarded. Since radioactive waste is dangerous, it has been necessary to sink it in deep seas or to store it in underground storage.

Recently, improved filtering apparatae which do not produce any secondary waste and can obtain treated water of better quality have been developed. Examples are an ultrafilter (hereinafter termed UF), and a filter comprising a flat film having numerous pores each having a diameter of 1 micron. However, since the ultrafilter must circulate a large quantity of water, not only the construction of the circulation system is complicated but also the cost of installation increases, whereas the flat film has a large tendency of clogging the minute pores with solid substances. In addition, it requires a large installation area.

In a nuclear electric power generating plant too, the same type of filters are used in a condensate feed system as well as primary water feed system for a nuclear reactor.

The particle size distribution of insoluble impurities (CRUD) contained in radioactive waste liquid and condensate or primary water fed into a boiling water type nuclear reactor is shown in FIG. 1. Although the particle size distribution varies more or less depending upon the type of the liquid or water to be filtered, a substantive portion of the CRUD has a particle size of about 1 micron, and the percentage of CRUD having a particle size of 0.1 micron or less is very small.

Consequently, in a UF having pores having a diameter much smaller than 0.1 micron, substantially no solid particles enter into the pores so that there is no tendency of clogging the pores with the solid particles because trapped solid particles can readily be removed by backwashing. Since in the UF, the pore size is small, the quantity of water that can be filtered is small which not only increases filtering area but also requires a high filtering pressure which also increases the cost of installation.

In a flat film type filter having a pore size of about 1 micron, since the waste liquid contains relatively large quantity of solid particles having a diameter of less than 1 micron, the tendency of clogging the pores increases whereby the film must be renewed frequently.

Recently, hollow fibers made of polyvinyl alcohol or copolymers thereof with styrene, etc., and having a sponge-like mesh structure were developed as disclosed in Japanese Laid-Open Patent Specification No. 73390/1980. The hollow fiber disclosed therein has a diameter of 0.5–5 mm and contains numerous pores interconnected to form a complicated mesh structure. Each pore has a diameter of 0.005–1.0 micron, preferably 0.01–0.5 micron. This polyvinyl alcohol hollow fiber has an excellent water permeability, and high acid resistant property. Usually, 1,000–5,000 fibers are bundled in a U-shape and water containing iron is passed through the U-shaped bundle of fibers. Then iron is trapped in the pores and high purity water suitable for use in boilers or preparation of foodstuffs or drinks can be obtained on the outside of the fibers.

But these polyvinyl alcohol fibers are solid having low mechanical strength so that they fracture or damage when subjected to a relatively small force or shock. Furthermore, clogged fibers cannot be regenerated with backwashing unless a special chemical agent is used. Presence of a chemical agent in nuclear reactor water, especially in a boiling water type reactor, is not permissible. In a nuclear power plant, water utilized in the plant is desired to have much higher purity than other applications. In other words, the concentration of solids in water should be extremely small.

When filtering water used in a nuclear power plant with hollow fibers having a sponge like mesh structure of the type described above, not only dense films of solids are formed on the surfaces of the fibers but also a large quantity of the solids flows into the pores thus clogging the same. In other industrial applications, since the concentration of the solids is high, they aggregate into large particles which close the openings of the pores, whereby even when solids of small particles are present in the water to be filtered, such small particles are prevented from entering into the pores, thus preventing clogging thereof. For this reason, in the case of a nuclear power plant, the pore diameter must be selected carefully for preventing clogging of the pores.

SUMMARY OF THE INVENTION

It is the principal object of this invention to provide an efficient apparatus for filtering water containing radioactive substances in nuclear power plants utilizing hollow fibers having a sponge-like structure which can be regenerated with water, have high mechanical strength and are flexible so as not to be broken by external force or shock.

Another object of this invention is to provide an improved filtering apparatus capable of efficiently trapping solid particles of radioactive substances and efficiently removing trapped solid particles with water thereby reducing the frequency of renewal of the hollow fibers.

According to this invention, there is provided apparatus for filtering waste water containing radioactive substances in a nuclear power plant comprising a casing, a plurality of synthetic resin hollow filters installed in the casing, each fiber having a sponge-like mesh structure containing a number of pores extending between inner and outer walls of the hollow fiber, means for admitting water containing radioactive solid particles into the casing for trapping the solid particles in the pores, thereby filtering the water, a collection chamber located opposite from the casing across a head plate and being in communication with the interior of the hollow fibers for collecting filtered water passing through the pores into the interior of the fibers; and means for withdrawing filtered water from the collection chamber, wherein the hollow fibers are made of flexible polyethylene and the pores have a diameter of about 0.1 micron.

DESCRIPTION OF THE PREFERRED EMBODIMENT

Figure 1:
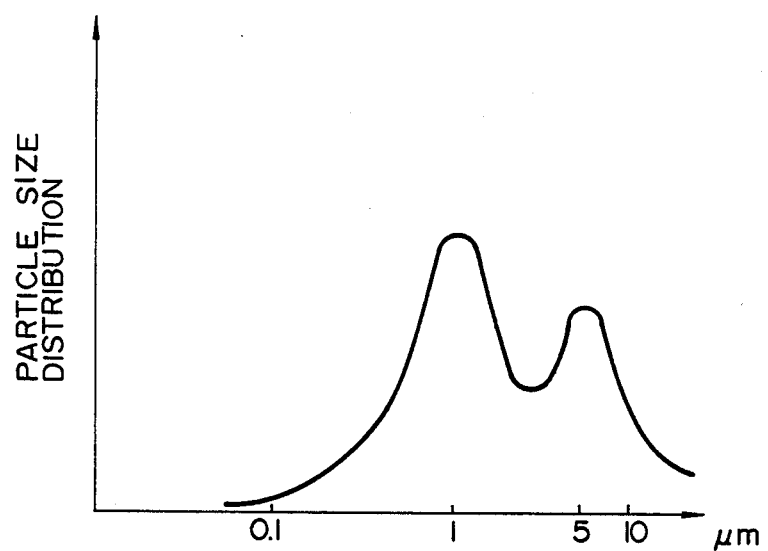
FIG. 1 is a curve showing a solid particle (or CRUD) distribution in water used in a nuclear power plant.
Figure 2:
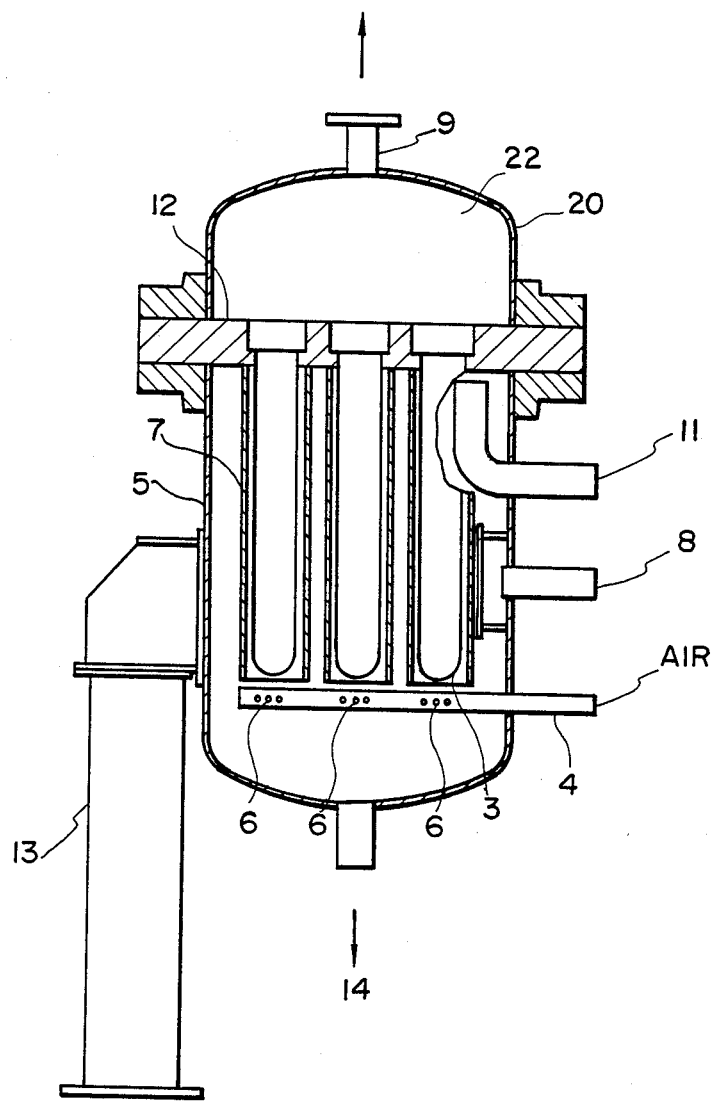
FIG. 2 is a longitudinal sectional view of the filtering apparatus embodying the invention.
Figure 3:
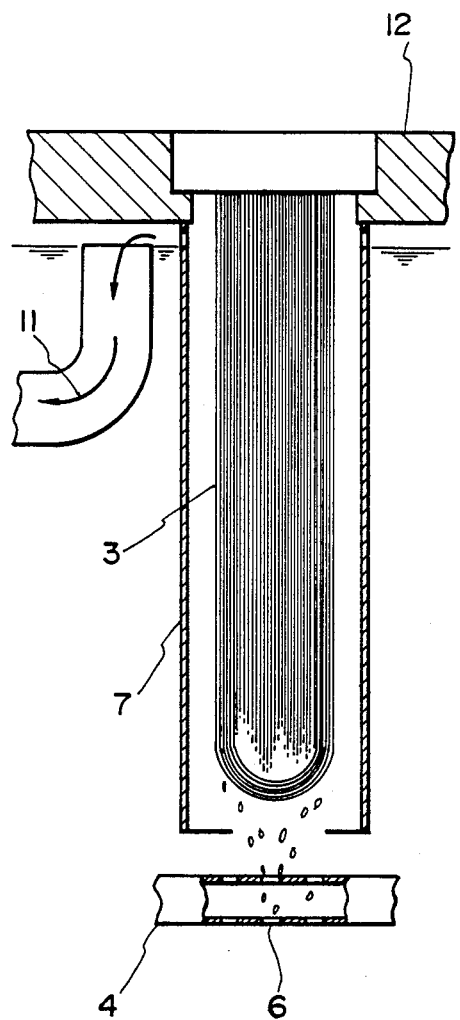
FIG. 3 is a side view, partly in section, showing one bundle of U-shaped hollow fibers during normal operation.

The filtering apparatus of this invention has a construction as shown in FIG. 2. As shown, the apparatus comprises a cylindrical casing 5 containing cylindrical partition walls 7 and a head plate 12 from which a plurality of U-shaped bundles 3 of hollow fibers having a sponge-like mesh structure are suspended.

Figure 4:
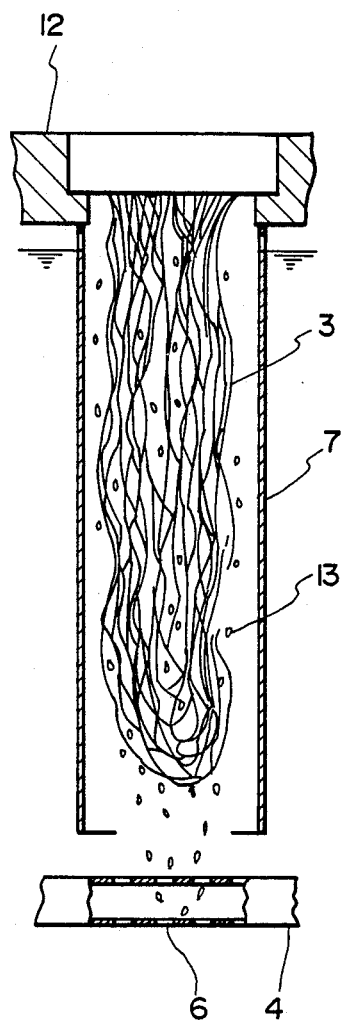
FIG. 4 is a side view showing the bundle at the time of backwashing.

Cap 20 is located on the opposite side of head plate 12 from casing 5 and defines collection chamber 22 which is in communication with the hollow interior of the fibers in bundles 3. Water containing radioactive impurities (CRUD) is admitted into the casing 5 through a pipe 8 and filtered while passing through numerous pores extending in the transverse direction of each hollow fiber. Cleaned water passes from the hollow interior of the fibers into collection chamber 22, from which it is discharged to the outside through pipe 9. The casing 5 is supported by a plurality of pedestals 13. To effect backwashing, pressure is applied to the interior of the casing 5, by pressurized air, for example. Then clean water is forced to pass through the pores to remove small solid particles trapped therein or large solid particles closing the outside openings of the pores. The solid particles thus removed are discharged to the outside of the casing 5 through a drain pipe 14 at the bottom thereof. At the time of backwashing, it is advantageous to blow air bubbles into the water in the casing 5 through air nozzles 6 provided for an air inlet pipe 4 near the lower ends of respective U-shaped bundles to vibrate the hollow fibers in various directions as shown in FIG. 4 to facilitate removal of the solid particles. Air collected beneath the head plate 12 is discharged to the outside through a discharge pipe 11.

According to this invention, the hollow fibers are made of flexible polyethylene. The following Table shows comparison of various mechanical characteristics of hollow fibers made of flexible polyethylene and polyvinyl alcohol.

TABLE

| Item | | | Sample Polyethylene | Polyvinyl alcohol |
|---|---|---|---|---|
| pull | ‖‖‖‖‖ | strength (g/fiber) | 336 | 253 |
| | | elongation (%) | 45.2 | 7.6 |
| knot | ‖‖‖‖‖ | strength (g/fiber) | 319 | impossible to measure |
| | | elongation (%) | 48.3 | because PVA fiber is brittle |
| hang | | strength (g/fiber) | 568 | |
| | | elongation (%) | 32.0 | |

Remarks:

As diagrammatically shown in the Table, in the pull test one end of a fiber was secured and the other end is pulled; in the knot test a knot is formed at an intermediate point of the fiber; and in the hang test one end of one U-shaped fiber is fixed, the other U-shaped fiber is hung from the one U-shaped fiber. The tested flexible polyethylene had a pore size sufficient to pass solid particles having a molecular weight of about 300,000.

As can be noted from this Table the flexible polyethylene hollow fibers utilized in this invention have higher mechanical strength than conventional polyvinyl alcohol hollow fibers. It should be particularly noted that the polyethylene hollow fibers utilized in this invention are pliable or flexible, so that there are such advantages that they would not be broken by external force so that they can be handled readily and that as shown in FIG. 4 they can bend in various directions during backwashing due to a turbulent flow caused by air bubbles thereby increasing removal of trapped solid particles. In contrast, since polyvinyl alcohol hollow fibers are solid and brittle they can not manifest these advantages.

As the filtering operation proceeds, the pressure difference between the inlet pipe 8 and the discharge pipe 9 increases as a result of trapping or clogging of the solid particles in the pores, so that when the pressure difference reaches a predetermined value, backwashing is carried out in a manner described above.

Figure 5:
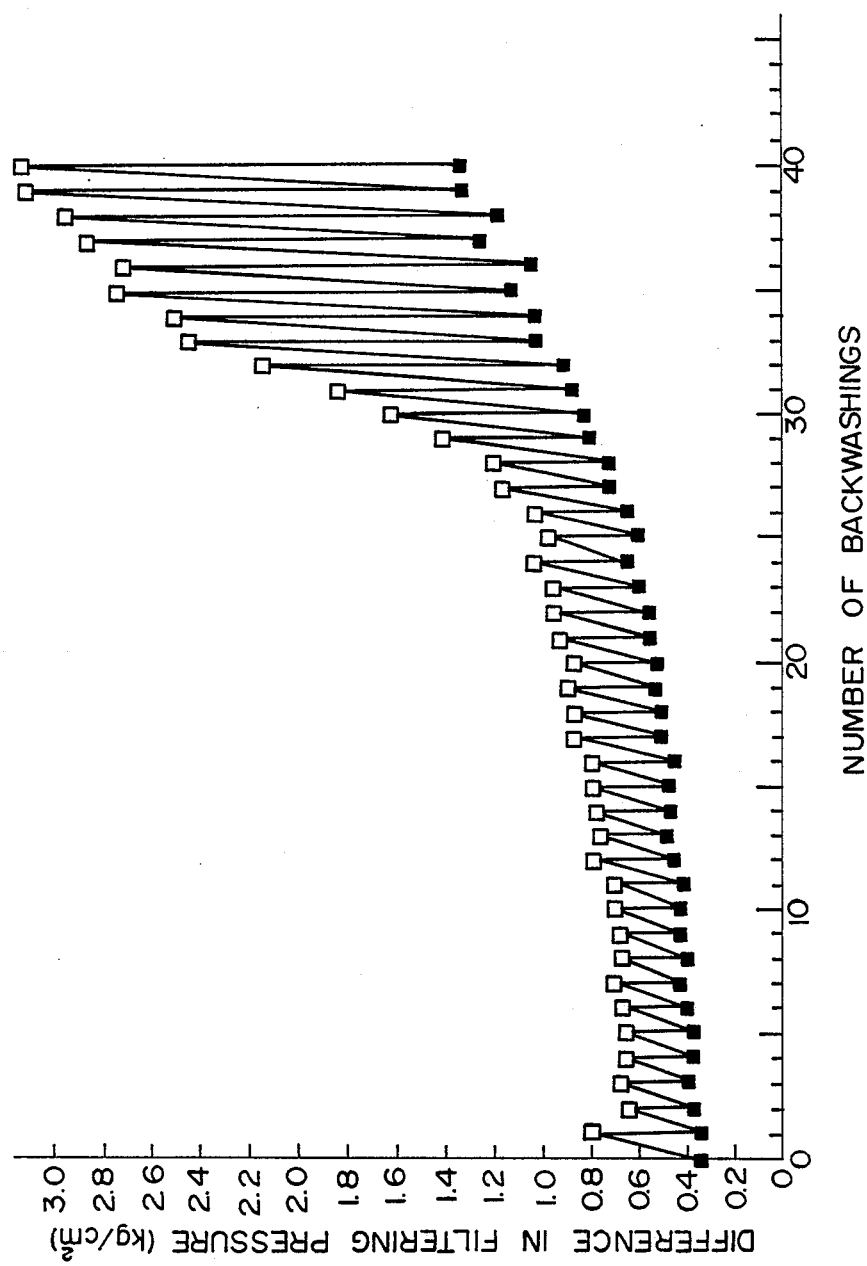
FIGS. 5 and 6 are graphs showing the relation between the number of backwashings and filtering pressure difference where hollow fibers having pore diameters of 1 micron and 0.1 micron respectively are used.
Figure 6:
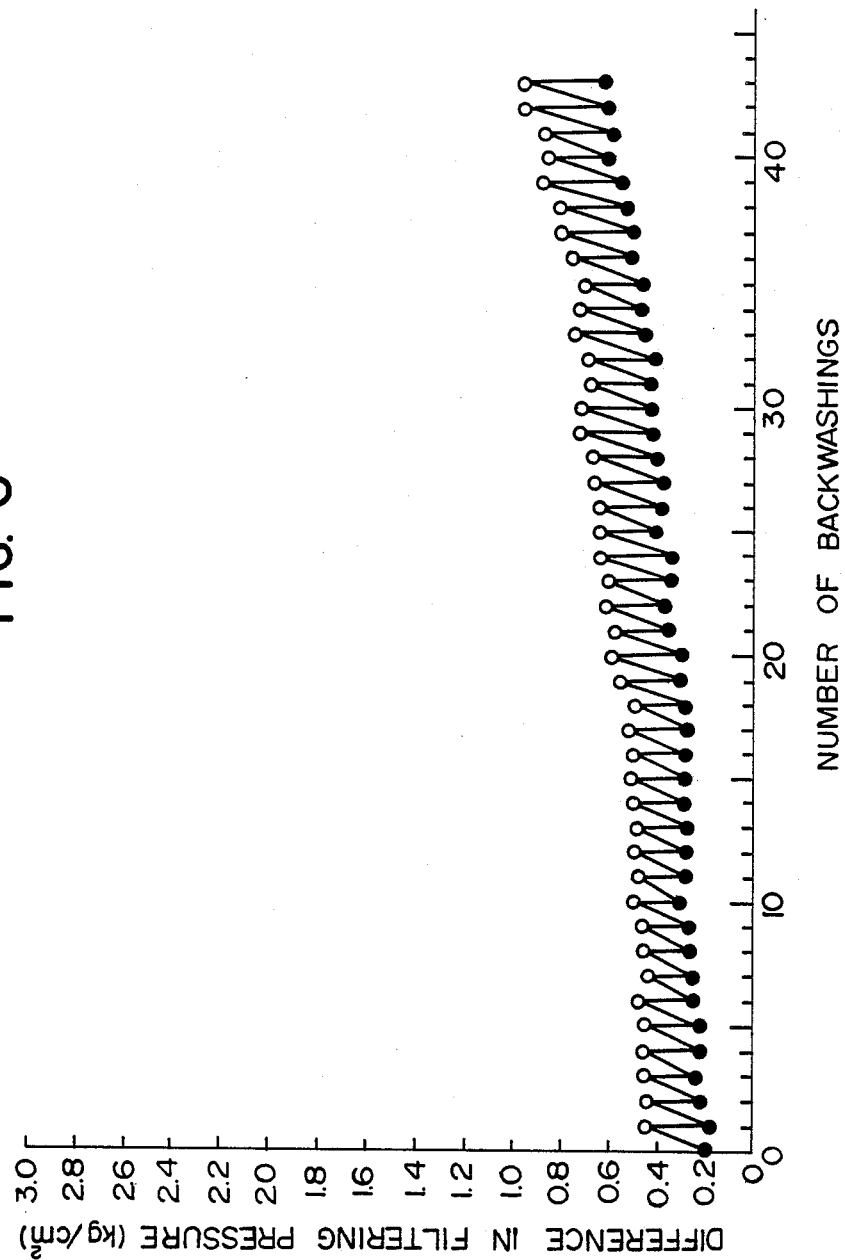

FIGS. 5 and 6 are graphs showing the relation between the number of backwashings and the variation in the pressure difference when hollow fibers having pore diameters of 1 micron and 0.1 micron respectively are used. Comparison of FIGS. 5 and 6 shows that, in the case of pore diameter of 1 micron, the rise in the pressure difference after backwashing is large (about 3.0 Kg/cm$^2$ or more), whereas in the case of pore diameter of 0.1 micron, the rise in the pressure difference is not so large (only about 1 Kg/cm$^2$). This means that with hollow fibers having a pore diameter of 1 micron, clogging is liable to occur but with hollow fibers having a pore diameter of 0.1 micron, the tendency of clogging is small with the result that the frequency of renewal of the hollow fibers can be reduced. As a consequence, hollow fibers having a pore diameter of about 0.1 micron are suitable for filtering water containing radioactive solid particles.

What is claimed is:

1. An apparatus for filtering waste water containing radioactive substances in a nuclear reactor comprising:
   a casing having a head plate;
   a plurality of synthetic resin hollow fibers formed in substantially U-shapes and freely suspended at each end of said fibers from said head plate within said casing in substantially vertical orientation, said fibers comprising flexible polyethylene and having a sponge-like mesh structure containing a number of pores extending between inner and outer walls of each hollow fiber, said pores having a diameter of approximately 0.1 micron;

means for admitting water containing radioactive solid particles into said casing under pressure;

a collection chamber located opposite from said casing across said head plate and being in communication with the interior of said hollow fibers for collecting filtered water passing through said pores into the interior of said fibers;

means for withdrawing filtered water from said collection chamber; and means for vibrating said hollow fibers to remove solid particles trapped thereby, said vibrating means including means, positioned beneath said fibers, for bubbling air into water surrounding said fibers.

2. The apparatus according to claim 1 wherein said water comprises radioactive waste water produced in a nuclear power plant.

3. The apparatus according to claim 1 wherein said water is primary system water of a boiling water type nuclear reactor.

4. The apparatus according to claim 1 wherein said polyethylene has a pore size sufficient to pass solid particles having a molecular weight of about 300,000.

5. An apparatus as claimed in claim 1, further comprising means, positioned adjacently beneath said head plate, for discharging from said casing air which has been introduced into said casing by said bubbling means.

6. An apparatus as claimed in claim 1, further comprising means for backwashing said hollow fibers, including said vibrating means.

7. A method for filtering waste water containing radioactive substances in a nuclear reactor, comprising the steps of:

admitting water containing radioactive solid particles under pressure into a casing having a head plate and a plurality of synthetic resin hollow fibers formed in substantially U-shapes and freely suspended at each end of said fibers from said head plate in a substantially vertical orientation within said casing, said fibers comprising flexible polyethylene and having a sponge-like mesh structure containing a number of pores extending between inner and outer walls of each hollow fibers, said pores having a diameter of approximately 0.1 micron;

withdrawing filtered water from a collection chamber located opposite from said casing across said head plate and being in communication with the interior of said hollow fibers for collecting filtered water passing through said pores into the interior of said fibers; and vibrating said hollow fibers to remove solid particles trapped thereby, said vibrating step including bubbling air from beneath said fibers into water surrounding said fibers.

8. A method as claimed in claim 7, further comprising the step of periodically backwashing said hollow fibers, said backwashing comprising the step of vibrating said fibers by bubbling air from beneath said fibers.

* * * * *